No. 712,527. Patented Nov. 4, 1902.
J. B. HANNAY.
PROCESS OF MANUFACTURING WHITE PIGMENT.
(Application filed Aug. 30, 1901.)
(No Model.) 2 Sheets—Sheet 1.
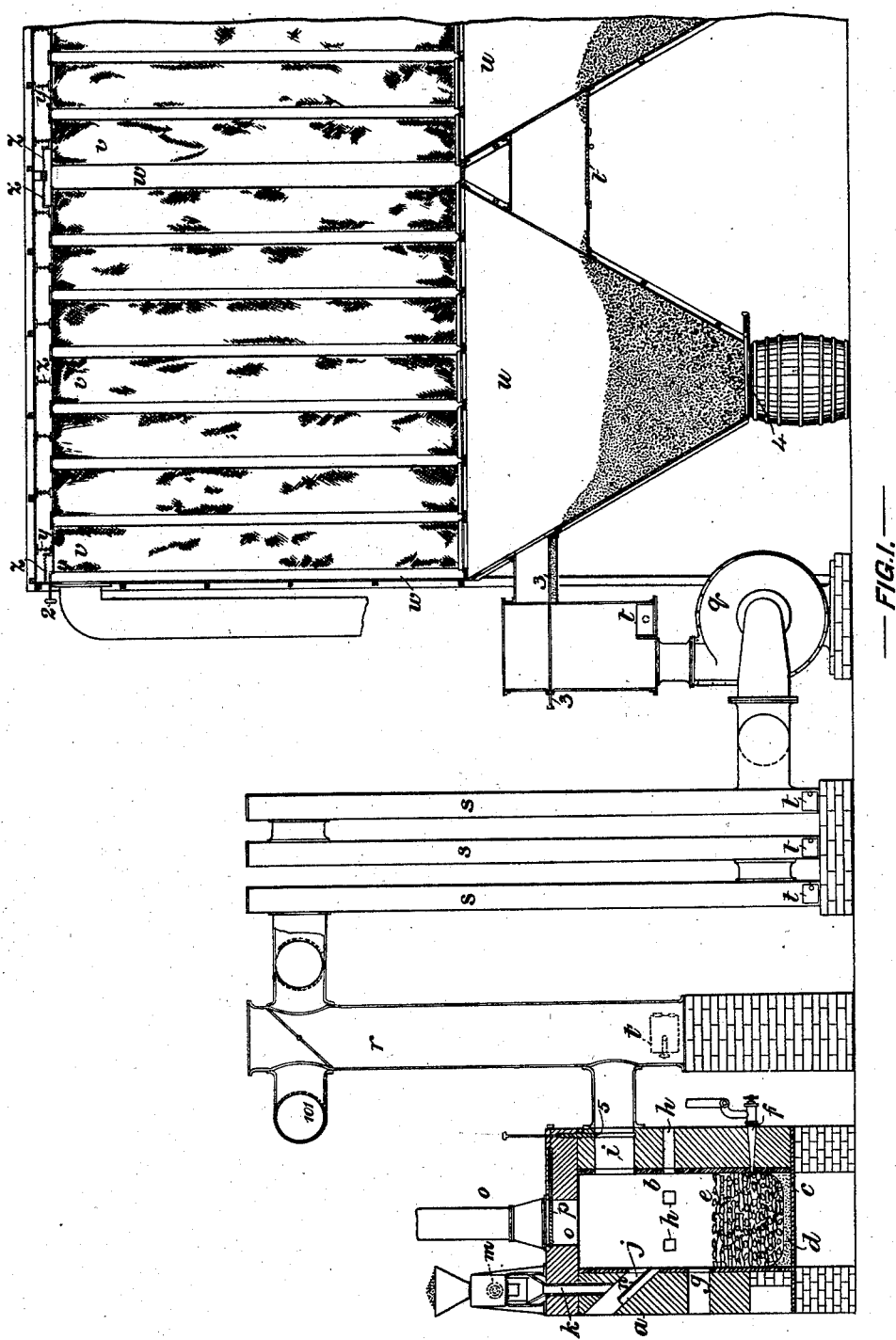

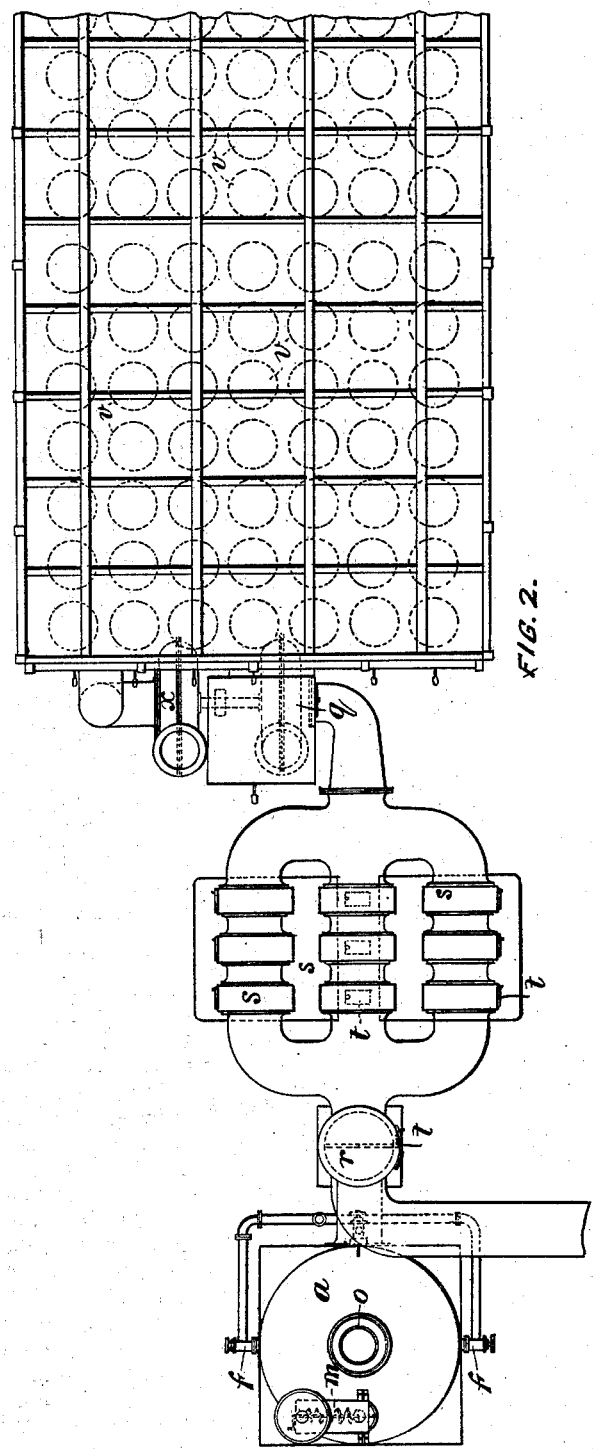

UNITED STATES PATENT OFFICE.

JAMES BALLANTYNE HANNAY, OF LOCH LONG, SCOTLAND.

PROCESS OF MANUFACTURING WHITE PIGMENT.

SPECIFICATION forming part of Letters Patent No. 712,527, dated November 4, 1902.

Application filed August 30, 1901. Serial No. 73,871. (No specimens.)

*To all whom it may concern:*

Be it known that I, JAMES BALLANTYNE HANNAY, chemist, a subject of the King of Great Britain and Ireland, residing at Cove Castle, Loch Long, county of Dumbarton, Scotland, have invented a certain new and useful Process of Manufacturing White Pigment, (for which I have made application for Letters Patent in Great Britain, No. 2,297, dated February 1, 1901,) of which the following is a specification.

My invention relates to the manufacture of a white pigment of basic sulfate of lead from galena or other sulfid-of-lead ore by furnacing operations.

Heretofore many attempts have been made to manufacture white pigments from lead ores, and several of these attempts have attained a measure of success. Certain difficulties, however, have been met with in all previous processes of this nature, so that the production of a pigment of a pure-white color is rendered uncertain. So great, indeed, have been the difficulties of obtaining pure-white pigments that previous processes have not been applied commercially for a long period, except such as involve more than one oxidizing operation.

The object of my invention is to produce a white basic sulfate-of-lead pigment from galena or other sulfid-of-lead ore by a single furnacing operation, conducted, however, in such a manner as to produce white of a uniform quality without difficulty and economically.

My invention consists in a new process or method of treating lead ore by furnacing.

In previously-attempted processes for furnacing lead ore two main methods have been followed.

According to one method of operation air is forced through a somewhat deep column of incandescent coke, carbonic oxid being produced, and the galena introduced into the furnace is vaporized in this carbonic-oxid atmosphere, producing at the same time some metallic lead. The volatilized lead sulfid mixed with the hot carbonic oxid is then conducted to a separate chamber or another part of the same chamber, where the carbonic oxid is burned to carbonic acid by the admission of air. The high temperature thus produced in the presence of an excess of air oxidizes the lead sulfid to lead sulfate. The sulfate so produced is white, or nearly so, and is collected in any suitable manner after cooling by means of bags or other devices. According to another method galena is fused in a crucible or converter. Air is then blown into or over the fused mass, and the galena is thus directly oxidized to sulfate of lead, which is collected as before. Here also metallic lead is produced. Both processes produce white pigment; but the first method is liable under ordinary conditions to blacken by contact of the freshly-formed sulfate with carbonic oxid at a temperature so low that when once partially reduced oxidation does not again result. This condition can only be avoided by great care in the manufacture. The care required, however, is too great to allow the process to be successful commercially. The second method avoids this difficulty; but it is practically impossible to handle fused sulfid of lead on a commercial scale in crucibles or converters. Any stoppage in the process at once solidifies the sulfid, and the converter is destroyed. My present invention overcomes the difficulties experienced in these processes.

My method consists in burning the galena directly to sulfate of lead at a single operation by utilizing large pieces or slabs of smelting-coke, upon which the galena is melted in small quantities and where it is burned in a similar manner as any liquid combustible material is burned from an absorbent wick by the direct impact of air practically without a carbonic-oxid flame. According to this method coke is used in the furnace; but the coke itself is not consumed—that is to say, the coke is not burned as an essential part of the process. The heat evolved to keep up the combustion and to continue the oxidation is mainly that due to the combustion of the lead sulfid in oxygen. Some coke is consumed, but only in a small quantity. The lead sulfate thus produced is cooled and collected in any suitable manner. The chief point of difference and advantage is found in the complete volatilization of the galena without producing metallic lead.

In practice I prefer to add a greater quantity of galena than the entering air will burn. The excess fusing and covering the coke will thus protect it more completely from oxidation and at the same time carry down any silver the ore may contain. Ultimately some fused galena with the silver collects at the furnace-bottom and is withdrawn along with the slag and gangue at intervals.

In carrying my invention into effect I construct a cylindrical furnace with a basic lining. Preferably I use the common magnesia and lime basic material as employed in the basic-steel process. I line my furnace with this basic material made into suitable bricks or by ramming it around a central core. The bottom of the cylindrical space I provide with a layer of coke breeze upon an iron plate. The layer of coke breeze being infusible prevents the excess of galena slag and gangue from adhering to the furnace-bottom and renders their removal easy in clearing out the furnace. I arrange three twyers at a short distance from this bottom, the twyers being at right angles to one another. I build up the coke, which is to be used in the form of long slabs, so as to leave ample space for the twyer-blast to distribute itself through the coke and over every part of its surface. This coke I build up to about twenty inches above the level of the twyers. In the side of the cylindrical furnace at the upper level of the coke I provide an opening to the atmosphere to supply air immediately over the upper coke-surface. Farther up within the same cylindrical furnace I provide other air-apertures. At the upper part of the cylindrical space I provide a discharge-aperture for the fumes. On the top of the furnace I provide an aperture connecting to a chimney provided with a damper to enable the furnace to be started when cold. I also provide a valve-controlled by-pass connected to the fume-discharge aperture and leading through a fan to a condenser. This is employed to take the product of the furnace when owing to any accident, such as a belt breaking, the product may be temporarily below the required standard of whiteness. At one side I arrange an inclined pipe directed toward the upper coke-surface, through which the galena is fed in regular and regulated quantities. I provide a vertical passage into the inclined pipe, and down this passage I drop the dry granulated galena as it is delivered from the mine. For this purpose I feed the galena to this vertical passage by means of a screw conveyer or other suitable device. To enable the mechanically-fed galena to be effectively sprinkled over the surface, I provide within the said inclined pipe a thin iron plate suitably curved and inclined. The galena falls upon this plate and rebounds from it into the furnace in all necessary directions.

I prefer to operate my furnace below atmospheric pressure, so that the air is aspirated through the air-supply apertures above described. For this purpose I arrange a fan or fans operated by power. The fan reduces the pressure within the furnace and draws the fume or pigment with an excess of air first through a dust-chamber then through coolers. These coolers I prefer to arrange as long vertical boxes or chambers, with pipe connections top and bottom. These connections cause the fume to pass through the whole length of each chamber up and down.

I find the rectangular shape a convenient one and thin metal desirable, as it enables me to strike the sides to detach any condensed fumes adhering to the same.

I provide suitable chambers with opening doors or drawers for extracting this fume or pigment.

From the coolers the cooled pigment and air passes through the fan and is forced into a hopper, above which a number of suspended cloth bags, preferably of flannel, are provided, through which the air is drawn to a chamber surrounding the bags. I effect this by means of another fan to assist the flow. The bags when shaken discharge the condensed fume or pigment into the hoppers below. To shake the bags, I suspend each bag from the top of the chamber by a chain attached to the plate forming the top of the bag. I connect the bags in a row together and attach them by a spring connection to the side of the chamber. By oscillating one plate at the end of the row by means of a suitable mechanical device the whole row is oscillated and white pigment is shaken down.

I provide suitable doors and drawers at various points of the apparatus to remove any deposit formed on the way to the hoppers and bags.

I will now describe my apparatus with reference to the accompanying drawings, in which—

Figure 1 is a part-sectional elevation, and Fig. 2 a plan.

The furnace $a$ is provided with a basic-lined cylindrical interior $b$, on the plate-iron bottom $c$ of which is placed the layer of coke breeze $d$ and pile of coke slabs $e$. Three twyers $f$ enter the furnace at about twenty inches below the top surface of the coke $e$, which is built up to the level of an air-inlet $g$, other air-inlets $h$ being provided farther up the furnace. A conveyer or other device $m$ feeds the galena down a vertical passage $k$, opening into an inclined pipe $j$, in which is a suitably curved and inclined plate $n$ for distributing the galena evenly over the coke. At the top of the furnace is a chimney $o$, fitted with a damper $p$ for use when starting the furnace. An exit $i$ for the fume, also fitted with a damper 5, connects the furnace with a dust-box $r$, leading to coolers $s\ s$, consisting of long vertical sheet-iron boxes or chambers connected alternately at the top and bottom, as shown. From the top of the dust-box $r$ a valve-controlled branch pipe 101 leads to a fan and condenser, which is common to a number of furnaces, and is used to draw discolored fume when accidentally produced, as above described. Doors or drawers $t$ are arranged at the bottom of the coolers $s$ for the removal of condensed fume detached by striking the walls of the coolers. A fan $q$ draws the fume from the furnace through the dust-box $r$ and coolers $s$ and delivers it into hoppers $u\,u$, above which are arranged a number of flannel-cloth bags $v$, through which the air and other gases are drawn to a chamber $w$, surrounding the bags, by a fan $x$. Each bag is suspended from the top of the chamber $w$ by a chain $y$, attached to the plate forming the top of the bag. The bags are arranged in rows together and attached by spring connections $z$ to the sides and top of the chamber $w$. By oscillating one plate at the end of a row by a handle or other device 2 the whole row is oscillated and the white pigment shaken down, or in some cases the shaking may be effected by mechanism. Suitable doors or drawers $t$ and, if necessary, scrapers 3 are provided at various points of the apparatus for the removal of deposit, and the hoppers $u$ are fitted with discharge-doors 4.

Having now described the general arrangement of my furnace and other apparatus, it only remains to indicate more minutely the reactions taking place in the furnace.

To start the furnace, I fill it up with large pieces or bars of coke, as I have described, finishing off at the level where air is admitted. The fire is then lighted up. To light up the furnace, the connection with the fume-condensing part is shut off and the products of combustion are discharged up the chimney described on the top of the furnace. When the coke and furnace are thoroughly hot, the damper of the chimney is closed and the exit from the furnace to the condenser is opened. The galena is now introduced, as described, in small quantities. It drops upon the iron spreading-plate, rebounds, and falls upon the coke, and when fused drips from bar to bar of coke. The air entering at the twyers passes over the surface of the coke (which, however, is largely protected by the melted sulfid which burns.) The dripping sulfid burns also very much in the manner of a flame burning inflammable melted material from a wick. A great inrush of air is caused immediately at the upper surface of the coke, which completes the oxidation of the sulfid and also assists in burning the sulfid on the top of the coke. The other air-inlets farther up insure excess of oxygen after the sulfate is formed, finally burning any carbonic oxid and completing the combustion of all combustible materials, so that the gases proceeding from the furnace to the dust-chamber contain practically nothing but oxidized materials with an excess of oxygen of the air. In this manner I entirely complete the oxidation of the sulfid to basic sulfate of lead within the furnace by adding excess of oxygen in such a quantity as to prevent any reducing action in the passages or coolers. It is essential that no reducing-gases should leave the furnace unburned.

Any excess of galena over the quantity which the furnace will volatilize carries down and concentrates the silver contained in the ore, and this excess collects with the slag and gangue on the coke breeze, which prevents adhesion to the furnace-bottom and renders its removal easy.

By this process I find that I only burn about twenty-eight pounds of coke to every hundredweight of sulfid treated. In the older processes, however, where the galena was not directly burned but was oxidized in a separate chamber, about six times the coke was required.

In this process no reduced lead is produced. The whole of the ore is passed into white sulfate-of-lead pigment.

Having now described my invention, what I claim as new, and desire to secure by Letters Patent, is—

1. The process of producing white pigment consisting in fusing sulfid-of-lead ore upon heated coke slabs and burning the ore directly to basic sulfate of lead from the coke slabs acting as wicks so that oxidation of the ore and volatilization of the resulting product takes place mainly by means of the heat generated in the formation of the said basic sulfate, substantially as described.

2. The process of producing white pigment consisting in fusing sulfid-of-lead ore upon heated coke slabs and burning the ore directly to basic sulfate of lead from the coke slabs acting as wicks so that oxidation of the ore and the volatilization of the resulting product takes place mainly by means of the heat generated in the formation of the said basic sulfate, the combustion being effected in an atmosphere containing an excess of oxygen whereby the products of combustion leaving the furnace contain no reducing-gases, condensing and collecting the pigment formed, substantially as described.

3. The process of producing white pigment consisting in fusing sulfid-of-lead ore upon heated coke slabs and burning the ore directly to basic sulfate of lead from the coke slabs acting as wicks so that oxidation of the ore and volatilization of the resulting product take place mainly by means of the heat generated in the formation of the said basic sulfate, the air for combustion being supplied under forced and induced draft substantially as described.

In witness whereof I have hereunto set my hand in presence of two witnesses.

JAMES BALLANTYNE HANNAY.

Witnesses:
M. ATKINSON ADAM,
ALBERT E. PARKER.